United States Patent [19]

Vo

[11] Patent Number: 5,422,378
[45] Date of Patent: Jun. 6, 1995

[54] FOAMABLE STYRENIC POLYMER GEL AND RESULTING FOAM

[75] Inventor: Chau V. Vo, Souffelweyersheim, France

[73] Assignee: The Dow Chemical Company, Midland, Mich.

[21] Appl. No.: 71,792

[22] Filed: Jun. 4, 1993

[51] Int. Cl.⁶ .............................................. C08J 9/00
[52] U.S. Cl. ................................ 521/79; 264/50; 264/51; 521/81; 521/97; 521/98; 521/139
[58] Field of Search ............ 521/79, 139, 98, 97, 521/81; 264/50, 51

[56] References Cited

U.S. PATENT DOCUMENTS

| | | | |
|---|---|---|---|
| 3,420,786 | 1/1969 | Weber et al. | 521/79 |
| 3,770,666 | 11/1973 | Quentin | 521/79 |
| 4,311,636 | 1/1982 | Hahn et al. | 521/94 |
| 4,312,910 | 1/1982 | Suh et al. | 521/149 |
| 4,421,866 | 12/1983 | Suh et al. | 521/79 |
| 4,438,224 | 3/1984 | Suh et al. | 521/79 |
| 4,636,527 | 1/1987 | Suh et al. | 521/79 |
| 4,959,412 | 9/1990 | Arter et al. | 521/139 |
| 5,189,071 | 2/1993 | Rhoads et al. | 521/79 |
| 5,218,006 | 6/1993 | Reedy et al. | 521/139 |
| 5,302,624 | 4/1994 | Reedy et al. | 521/139 |

FOREIGN PATENT DOCUMENTS

| | | |
|---|---|---|
| 633239 | 12/1963 | Belgium . |
| 0411923 | 2/1991 | European Pat. Off. . |
| 0217516 | 9/1991 | European Pat. Off. . |
| 2043648 | 10/1980 | United Kingdom . |
| 2043648A | 10/1980 | United Kingdom . |

OTHER PUBLICATIONS

Patent Abstracts of Japan, vol. 12, No. 248, (C-511) (3095) Jul. 13, 1988.
Chemical Abstract, 27913p, vol. 80, No. 6, Feb. 11, 1974.
Sales Specifications of Resin 18, Amoco Chemical Company, Bulletin R-37f.
KRISTALEX® 1120, Technical Information, Hercules Incorporated Resins Group, Number 7272-4.
Derwent 72-40818T/25 (Kanegafuchi Chemical).

Primary Examiner—Morton Foelak

[57] ABSTRACT

An expandable monovinylidene aromatic polymer resin composition comprising: a) a monovinylidene aromatic substrate polymer; b) a plasticizing amount of a solid (at room temperature and pressure), low molecular weight polymer of limonene or alpha methyl styrene and, optionally, another copolymerizable vinyl aromatic monomer, having a weight average molecular weight of from about 1,000 to about 70,000, a volatiles content of up to about 30% and a glass transition temperature of at least about 25° C.; and c) a blowing agent. The invention further includes a process for producing a closed-cell polymer foam from the composition of the invention, and the resulting polymer foam. Advantageously, the foam of the invention can be produced using only $CO_2$ as a blowing agent.

22 Claims, No Drawings

FOAMABLE STYRENIC POLYMER GEL AND RESULTING FOAM

BACKGROUND OF THE INVENTION

The present invention relates to a polymeric foam, particularly a styrenic foam.

Thermoplastic foams such as styrenic polymer foams, are widely used in the fields of construction, civil engineering and thermal insulation. The styrenic polymer foam suitable for such applications desirably is extruded and has good dimensional stability and relatively small cells. These foams are the so-called extruded foams. Extruded foams are also employed in the so-called decorative field wherein a foam plank may be cut into a decorative foam and be used as is or used as a base for further decorative material. For a considerable period of time, styrenic polymer foams have been extruded employing a variety of organic blowing agents, such as chlorofluorocarbons (CFC's), hydrochlorofluorocarbons (HCFC's) and other halogenated hydrocarbons as well as mixtures thereof. However, large efforts currently are being made to replace CFC's, and other fully halogenated hydrocarbons with environmentally more acceptable blowing agents due to increased environmental concerns about ozone depletion, greenhouse effects and air quality in general.

It would be highly desirable to provide a process for preparing a low density styrenic polymer foam using a partially or entirely pristine, i.e. nonhalogenated, blowing agent. Furthermore, it also would be highly desirable to provide a low density styrenic polymer foam, prepared using a partially or entirely pristine blowing agent, with improved processability without sacrificing other physical properties such as compressive strength and dimensional stability.

SUMMARY OF THE INVENTION

The composition of the present invention is an improved expandable monovinylidene aromatic polymer resin composition comprising: a) a monovinylidene aromatic polymer; b) a plasticizing amount of a low molecular weight polymer of limonene or alpha methyl styrene and, optionally, another copolymerizable monomer, the low molecular weight polymer having a weight average molecular weight of from about 1,000 to about 70,000, a volatiles content of up to about 30% and a glass transition temperature of at least about 25° C.; and c) a blowing agent. The composition surprisingly has improved flow characteristics.

The invention further includes a process for producing a closed-cell polymer foam from the composition of the invention, and the resulting polymer foam. Advantageously, the foam of the invention can be produced using only $CO_2$ as a blowing agent.

DETAILED DESCRIPTION OF THE INVENTION

The plasticizer of the present invention serves to improve the flow properties of the host polymer while maintaining or only slightly lowering rigidity and toughness while, surprisingly, maintaining or only slightly lowering the heat distortion temperature. Advantageously, the plasticizer is a solid at room temperature and pressure, and is a low molecular weight polymer of alpha methyl styrene or limonene, with d-limonene being the preferred limonene. The plasticizer can be a copolymer or a homopolymer. Advantageously, the plasticizer has a weight average molecular weight of at least about 1,000, preferably at least about 1,200, more preferably at least about 1,500, and most preferably greater than or equal to 5,000. Advantageously the plasticizer has a molecular weight of less than about 70,000, preferably less than about 50,000, more preferably less than about 30,000, and most preferably less than about 25,000. Advantageously, the Tg of the plasticizer is at least about 25° C. The plasticizers based on the copolymers of alpha methyl styrene preferably have a glass transition temperature of at least about 30° C. More preferably, the Tg of the plasticizer is at least about 50° C. and most preferably is at least about 70° C. The volatiles content of the plasticizer advantageously is lower than about 30% otherwise an excessive drop in the heat properties of the final blend can be expected. Preferably, the volatiles content is less than about 25%, and more preferably is less than about 20%. For the purposes of the present invention, the volatiles content is measured at 200° C. and 2 mm Hg vacuum for 100 minutes.

The plasticizer is employed in a plasticizing amount. Suitably, the amount is such that the melt flow properties of the composition are improved. Advantageously, from about 0.1 to about 30 weight percent of the plasticizer is employed based on the total weight of the matrix polymer and the plasticizer. Preferably, the plasticizer is employed in an amount which is from about 1 to about 25 weight percent. More preferably, the amount of plasticizer is from about 2 to about 20 weight percent, and most preferably the amount is from about 2.5 to about 15 percent. Mixtures of plasticizers of the invention can be employed. Advantageously, the polymeric plasticizer is compatible with the monovinylidene aromatic polymer matrix and has a significantly lower viscosity.

The low molecular weight polymer plasticizer can be prepared by any of the known polymerization methods known to those skilled in the art including, for example, anionic, cationic or free radical polymerization. Additionally, many such polymers are commercially available. When a comonomer is employed in the preparation of the plasticizer, the amount of comonomer suitably is less than 50% and preferably is less than 20% based on the total weight of residual monomer units in the plasticizer. Examples of other comonomers for the plasticizer include, for example, styrene, which is preferred, and the monomers and comonomers described hereinbelow as being useful in the preparation of the monovinylidene aromatic polymer resin.

The monovinylidene aromatic polymer resins are well-known to those skilled in the art, are widely available commercially, and can be prepared by any of the several polymerization methods known to those skilled in the art including, for example anionic, cationic or free radical, which is preferred, polymerization. In general, continuous methods are employed for polymerizing the monovinyl aromatic compound. The weight average molecular weight of the monovinylidene aromatic polymer resin employed in the present invention advantageously is at least about 100,000 and preferably is at least about 130,000. The weight average molecular weight of the monovinylidene aromatic polymer resin advantageously is less than about 700,000, and preferably is less than about 400,000.

The polymer resins of the present invention are derived from one or more monovinyl aromatic compounds. Representative monovinyl aromatic compounds include styrene; alkyl substituted styrenes such as alpha-alkyl-styrenes (e.g., alpha methyl styrene and alpha ethyl styrene) and ring alkylated styrenes and isomers thereof (e.g., ortho ethyl styrene, 2,4-dimethyl styrene and vinyltoluene, particularly, ortho or para vinyl toluene); ring substituted halo-styrenes such as chlorostyrene, 2,4-dichloro-styrene and the like; and styrenes substituted with both a halo and alkyl group such as 2-chloro-4-methylstyrene; and vinyl anthracene. In general, the preferred monovinyl aromatic monomers are styrene, alpha methyl styrene, one or more of the vinyl toluene isomers, and/or mixture of two or more of these, with styrene being the most preferred monovinyl aromatic compound.

The monomer mixture for the resin may optionally comprise minor amounts of one or more additional comonomers, preferably in an amount less than 10 percent by weight of the polymerizable monomer mixture. Suitable comonomers are unsaturated nitriles, for example acrylonitrile; alkyl acrylates and alkyl methacrylates, for example methyl methacrylate or n-butylacrylate; ethylenically unsaturated carboxylic acid monomers; and ethylenically unsaturated carboxylic acid derivative monomers including anhydrides and amides such as maleic anhydride, and maleimides such as N-phenyl maleimide.

The monovinylidene aromatic polymer resin can also contain other additives such as additional plasticizers or lubricants such as mineral oil, butyl stearate or dioctyl phthalate; stabilizers, including antioxidants (e.g., alkylated phenols such as di-tert-butyl-p-cresol or phosphites such as trisnonyl phenyl phosphite); mold release agents, e.g., zinc stearate; flame retardants; pigments; and the like.

The compositions of the present invention advantageously can be employed in the preparation of styrenic polymer foam. Some advantages of using the composition of the present invention in a process to prepare foam include: reduced pressure drop across the extrusion line; lower foam density; and maintenance of good mechanical and heat resistance properties of the foam.

The foam blowing method of the present invention comprises foaming the composition of the invention to produce a styrenic foam. In a preferred embodiment of the method of the invention, the method comprises producing a styrenic foam by heating the plasticized styrenic resin in an extruder to produce a molten resin; introducing into the molten resin a blowing agent to produce a plasticized extrusion mass under a pressure sufficient to prevent foaming of the extrusion mass; and extruding the extrusion mass through a die into a zone having a temperature and pressure sufficient to permit foaming of the extrusion mass to produce the styrenic foam.

The blowing agent, i.e. foaming agent, used herein can be any known in the art for thermoplastic foams. See, for example: U.S. Pat. Nos. 3,770,666; 4,311,636; 4,636,527; 4,438,224; 3,420,786; and 4,421,866. Examples of such blowing agents include commonly used liquid or gaseous organic compounds which do not dissolve the polymer and which have a boiling point below the softening point of the polymer. A wide variety of volatile fluid blowing agents which are carbon-containing compounds can be utilized. They include such materials as the aliphatic or cycloaliphatic hydrocarbons including ethane, ethylene, propane, propylene, butane, butylene, isobutane, pentane, neopentane, isopentane, hexane, heptane, cyclohexane and mixtures thereof, as well as fully or partially halogenated hydrocarbons such as methylene chloride, chlorodifluoromethane; 1-chloro-1,1-difluorethane; 1,1,1,2-tetrafluoroethane; 2-chloro 1,1,1,2-tetra-fluoroethane, pentafluoroethane, 2,1,1,1-dichloro-difluoroethane, 1,1-difluoroethane and 1,1,1-trifluoroethane and 1,1-difluoroethane. Preferably, the blowing agents generally exhibit a boiling point of not greater than 100° C. at 100 kPa absolute pressure. Other useful fluid blowing agents are the tetraalkyl silanes such as tetramethylsilane, trimethylsilane, trimethylisopropylsilane and trimethyl n-propylsilane, having a boiling point not higher than 100° C. at 100 kPa absolute pressure.

Mixtures of blowing agents may be employed. The blowing agent is employed in an amount sufficient to enable the production of the foam. It is advantageous to use 3 to 18 percent by weight of blowing agent based on the polymer, preferably 4 to 15 percent.

Due to environmental concerns, it is preferred to employ blowing agents having an ozone depletion potential of zero or less. It is preferred to employ a partially or entirely pristine blowing agent. The term pristine blowing agent, as used herein, is meant to define nonhalogenated blowing agents such as, for example, carbon dioxide, nitrogen, water, argon and the like. In one embodiment it is preferred to use carbon dioxide alone or in admixture with one or more of the previously described blowing agents. In a particularly preferred embodiment, $CO_2$ is the only blowing agent. In a preferred embodiment of the invention, the blowing agent is a mixture of $CO_2$ and a lower alcohol of from 1 to about 6 carbon atoms, more preferably up to 4 carbon atoms. Examples of lower alcohols include, for example, methanol, ethanol, isopropanol, propscol, butanol, pentanol and hexanol, with ethanol being more preferred. In another preferred embodiment, the blowing agent is a mixture of $CO_2$ and a hydrocarbon blowing agent, with $C_{1-5}$ alkanes being preferred.

The blowing agent employed in the present invention preferably comprises 5 weight percent or more, preferably 10 weight percent or more, and more preferably 20 weight percent or more carbon dioxide based upon the total weight of the blowing agent. It is advantageous to employ as much carbon dioxide as possible in the blowing agent while still making a desirable foam structure because carbon dioxide is economical and does not harm the environment.

Small amounts of water (0.1-4 wt. %) may be used in the foam preparation process with or without an appropriate solubilizing or dispersing agent such as an alcohol, glycol, surfactant, etc. In the preparation of foams in accordance with the method of the invention, it is often desirable to add a nucleating agent to the styrenic resin. These nucleating agents serve primarily to increase cell count and reduce the cell size in the foam and are used in an amount of about 0.1 part by weight to about four parts by weight per one hundred parts resin. For example, talc, sodium bicarbonate/citric acid, calcium silicate and the like are suitable nucleating agents for reducing cell size. Talc is a preferred nucleating agent. Various other additives, for example, flame retardant additives, color concentrates, stabilizers, anti-oxidants, lubricants, etc. also may be used depending on the end use of the styrenic foam.

The invention comprises a method for producing a styrenic foam having a thickness of from about 0.04 to about 4.0 inches or more, using the blowing agent compositions of the invention. Packaging foams are anywhere from 0.04 to 0.200 inches, while insulating foams may be as thick as 4.0 inches or higher. In the preferred method of the invention, a styrenic foam is produced from a "styrenic resin," which means a solid polymer of one or more polymerizable monovinyl aromatic compounds or a compatible mixture of such polymers. The preferred styrenic resin includes a plasticizing amount of a low molecular weight polymer as is described hereinabove.

In the method of the invention, the styrenic resin is mixed with a blowing agent composition and the resulting mixture is then foamed according to methods well known to those skilled in the art. Preferably, the foaming is carried out with the use of an extruder, wherein the styrenic polymer is heated to a temperature of from about 200° to about 280° C. to produce a molten polymer and the blowing agent is then introduced into the extruder where it is mixed with the molten polymer under pressures such that the resulting plasticized extrusion mass does not foam, but its viscosity decreases. The extrusion mass is then cooled. Cooling increases the viscosity and the melt strength of the mass prior to extrusion. The mass is then extruded through a die of any desirable shape of a controlled temperature, usually about 100° to about 150° C., the reduced pressure outside the extruder permitting the extrusion mass to foam.

In practicing the method of the invention, the blowing agent may be added to the styrenic resin in any desirable manner and preferably is added by injection of a stream of the blowing agent composition directly into the molten styrenic resin in the extruder. The blowing agent should be mixed thoroughly with the styrenic resin before the blowing agent and styrenic resin mass is extruded from the die. This is necessary to produce a foam having uniform density and cellular structure.

The extrusion mass comprising the molten resin and the blowing agent composition is extruded into an expansion zone within which foam formation and expansion takes place. Any suitable extrusion equipment capable of processing foamable styrenic compositions can be used for the extrusion. Single or multiple-screw extruders can be used. Softening the polymer and mixing with the blowing agent take place during working of the polymer between flights of the screw or screws, which also serve to convey the extrusion mass to the extruder die. Screw speed and extruder barrel temperature should be such as to achieve adequate mixing and softening but not so high as to degrade the composition being processed.

The foams can be used in the form prepared, cut into other shapes, further shaped by application of heat and pressure or otherwise machined or formed into shaped articles of desired size and shape.

The foam structure is preferably closed-cell, and has a closed-cell content of at least 90 percent according to ASTM D2856-87. The foam structure preferably has density of about 16 to about 80 kilograms per cubic meter according to ASTM D-1622. The foam further preferably has an average cell size of about 0.05 to about 2.4 millimeters.

SPECIFIC EMBODIMENTS OF THE INVENTION

The following experiments illustrate the present invention and should not be construed to limit its scope. All parts and percentages are by weight and all temperatures are degrees Celsius unless otherwise indicated.

The abbreviations used in the tables include Mw (weight average molecular weight), Mn (number average molecular weight), PAMS (polyalphamethylstyrene), SAMS (styrene alpha methyl styrene copolymer) and Wt % (weight percent).

Example 1, Polystyrene plus PAMS

Polymer resins are prepared by dry blending a small quantity of plasticizer with a general purpose polystyrene resin. The dry blend is then extruded to obtain a homogeneous blend. The extrudate is cut into small granules.

A poly(alpha methyl styrene) polymer is employed as the plasticizer. It is a low molecular weight homopolymer of alpha methyl styrene, designated PAMS-B, which is commercially available from Amoco Chemical Company as Resin 18-290. It has an Mw of 11,900 and an Mn of 400. It contains approximately 14% volatile components as measured at 200° C. for 100 minutes under a vacuum of 2 mm Hg. PAMS-B has a glass transition temperature of 142° C. as measured by differential scanning calorimetry (DSC).

As used herein, the weight average molecular weight, Mw, and number average molecular weight, Mn, for the low molecular weight polymer is determined by the gel permeation chromatographic techniques described by ASTM test method D-3536 (polystyrene standard) and expressed without correction for the differences between polymer and polystyrene standards.

Example 2, Foam

Example 2A

Closed cell styrene polymer foams are prepared utilizing a 2-inch diameter extruder which feeds a mixer. The mixer discharge stream is passed through three heat exchangers. The discharge from the heat exchangers is passed through a static mixer, and is expanded through a slot die into a region of lower pressure.

A mixture of a polystyrene resin having a weight average molecular weight of 200,000 as measured by liquid chromatography and PAMS-B is prepared according to the method of Example 1 and is fed to the extruder with 2.5 pph (parts per hundred based on polymer) of hexabromocyclododecane (HBCD), 0.2 pph of tetrasodiumpyrophosphate (TSPP) 0.2 pph of barium stearate and 0.15 pph of a cyano-phthalo blue dye concentrate. PAMS-B is added at levels of 1 and 2.9% based on the weight of the total polymer mixture. Blowing agents are injected into the mixer in the amounts identified in Table 1. The foamable gel is cooled to 129° C. and extruded through the die and expanded between substantially parallel forming plates. Foam production conditions and physical property values of the resulting foams are given in Table 1.

TABLE 1

| | | | | Blowing Agent | |
|---|---|---|---|---|---|
| | Polystyrene % | PAMS-B % | Additives (pph) | HCFC-142b (pph) | $CO_2$ (pph) |
| H1* | 100 | 0 | 3.05 | 10 | 2 |
| H2 | 99 | 1 | 3.05 | 10 | 2 |
| H3 | 97.1 | 2.9 | 3.05 | 10 | 2 |

| | Pressure | | Pressure | | Cell |
|---|---|---|---|---|---|
| | Mixer (bar) | Die (bar) | Drop (bar) | Density (kg/m³) | Size (mm) |
| H1* | 143 | 63 | 80 | 36.7 | 0.20 |

TABLE 1-continued

| | | | | | |
|---|---|---|---|---|---|
| H2 | 132 | 59 | 73 | 35.0 | 0.23 |
| H3 | 133 | 65 | 68 | 33.0 | 0.25 |

| | Compressive strength | | | | |
|---|---|---|---|---|---|
| | Vertical (kPa) | Extrusion (kPa) | Horizontal (kPa) | HDT (°C.) | WD (%) |
| H1* | 534 | 229 | 247 | 73 | 3.10 |
| H2 | 489 | 228 | 239 | 76 | 1.91 |
| H3 | 466 | 197 | 231 | 73 | 2.09 |

| | E. D. C. | | | | |
|---|---|---|---|---|---|
| | Vertic. (%) | Extrusion (%) | Horiz. (%) | Vol. (%) | Skin |
| H1* | 0 | 5.6 | 0.6 | 6.2 | Good |
| H2 | 0.3 | 4.9 | 1.1 | 6.3 | Good |
| H3 | 0.2 | 6.6 | 0.7 | 7.5 | Acceptable |

*Comparative Experiment

Surprisingly, the foam density for Experiments H2 and H3 is lower than that of H1, the control. The compressive strength values are equivalent to that of the control foam at equivalent foam density. The heat resistance performance as measured by the "WD" test (German DIN-18164 standard), and the heat distortion temperature is maintained or improved.

Example 2B

Foams are produced using the procedure and apparatus of Example 2A with the following exceptions. The blowing agent is a mixture of 3 pph carbon dioxide and 3.5 pph ethanol. The PAMS-B level ranges from 2.9% to 9.1% of total the polymer mixture. Foam production conditions and physical properties are given in Table 2.

TABLE 2

| | Poly- | | | Blowing Agent | |
|---|---|---|---|---|---|
| | styrene (%) | PAMS-B (%) | Additives (pph) | Ethanol (pph) | $CO_2$ (pph) |
| I4* | 100 | 0 | 2.15 | 3.5 | 3 |
| I5 | 97.1 | 2.9 | 2.15 | 3.5 | 3 |
| I6 | 95.2 | 4.8 | 2.55 | 3.5 | 3 |
| I7 | 90.9 | 9.1 | 2.55 | 3.5 | 3 |

| | Pressure | | Pressure | | Cell |
|---|---|---|---|---|---|
| | Mixer (bar) | Die (bar) | Drop (bar) | Density (kg/m$^3$) | Size (mm) |
| I4* | 168 | 68 | 100 | 36.2 | 0.38 |
| I5 | 150 | 65 | 85 | 34.6 | 0.34 |
| I6 | 146 | 56 | 90 | 35.0 | 0.43 |
| I7 | 138 | 61 | 77 | 34.2 | 0.40 |

| | Compressive strength | | | | |
|---|---|---|---|---|---|
| | Vertic. (kPa) | Extrusion (kPa) | Horiz. (kPa) | HDT (°C.) | WD (%) |
| I4* | 446 | 176 | 240 | 88 | 1.40 |
| I5 | 382 | 193 | 245 | 88 | 2.27 |
| I6 | 406 | 232 | 227 | 91 | 2.27 |
| I7 | 408 | 198 | 222 | 88 | 2.03 |

| | E.D.C. | | | | |
|---|---|---|---|---|---|
| | Vertic. (%) | Extrusion (%) | Horiz. (%) | Volume (%) | Skin |
| I4* | −0.2 | 0.9 | −0.3 | 0.4 | Good |
| I5 | −0.2 | −0.3 | 0.6 | 0.1 | Acceptable |
| I6 | −0.2 | 0.0 | 0.0 | −0.2 | Good |
| I7 | −0.1 | 0.7 | −0.2 | 0.4 | Good |

*Comparative Experiment

Example 2B demonstrates the lower foam density, reduced pressure drop and good mechanical properties, including dimensional stability, obtained using the invention.

Example 2C

The procedure of Example 2A is followed with the following exceptions. The apparatus is a 1¼″ screw type extrusion line with a slit die. The temperature of the cooling zone is adjusted so that the gel is cooled to a uniform temperature of 135°–140° C. Further details and results are contained in Table 3.

TABLE 3

| | Poly- | | Blowing Agent | |
|---|---|---|---|---|
| | styrene (%) | PAMS-B (%) | $CO_2$ (pph) | $H_2O$ (pph) |
| J8* | 100 | 0 | 4.5 | 0 |
| J9 | 80 | 20 | 4.0 | 0 |
| J10* | 100 | 0 | 4.0 | 0.3 |
| J11 | 80 | 20 | 4.0 | 0.3 |

| | Pressure | | | | Cell | |
|---|---|---|---|---|---|---|
| | Mixer (in bar) | Die (bar) | Pressure Drop (bar) | Density (kg/m$^3$) | Size (mm) | Skin |
| J8* | 227 | 128 | 99 | 39.6 | 0.21 | Good |
| J9 | 189 | 119 | 70 | 40.4 | 0.26 | Good |
| J10* | 207 | 121 | 86 | 38.5 | 0.21 | Good |
| J11 | 177 | 110 | 67 | 36.7 | 0.35 | Good |

*Comparative Experiment

The results of Example 2C confirm the effect of the invention using different blowing agents, including $CO_2$ alone and $CO_2$ with water.

Foam Physical Property Testing Methods

Density: ASTM D-1622.
Cell size: ASTM D 3576-77.
Compressive Strength: ASTM 1621-79.
WD test: German DIN 18164.
Heat distortion temperatures (HDT) are measured according to the following test method. The average value of three specimens is reported. Extruded foam is cut into sample blocks 20 cm long and 10 cm wide, with the thickness as extruded. A block is placed in an oven, heated to a specified temperature, held at that temperature for 1 hour, and then is allowed to cool to ambient temperature. Testing conditions start at 73° C. Foam dimensions are measured before heating and after cooling. The test is then repeated with new samples, increasing the temperature in increments of 3° C. for each new sample, and this is repeated until the specimens fail. Failure is determined by a volume change of more than 5% or a change in length, width or height of more than 2%. The reported value is the last non-failing value.

Environmental dimensional change (E.D.C.): ASTM C-578-83.

What is claimed is:

1. A process for producing a closed-cell polymer foam comprising heating an expandable monovinylidene aromatic polymer composition comprising:
   (a) an optionally rubber-reinforced monovinylidene aromatic polymer having a weight average molecular weight of at least about 100,000; and
   (b) from about 1 to about 30 weight percent of a low molecular weight polymer of limonene or alpha methyl styrene having a weight average molecular weight of from about 1,000 to about 70,000, a volatiles content of up to about 30% and a glass transition temperature of at least about 25° C.

to a temperature sufficient to provide a molten polymer; admixing an entirely pristine blowing agent with said molten polymer to provide a plasticized mixture; heating the mixture to a temperature and applying a pressure such that the plasticized mixture does not foam; and thereafter, expanding the plasticized mixture at a reduced pressure to form a foam structure.

2. The process of claim 1 wherein the amount of low molecular weight polymer of limonene or alpha methyl styrene is from about 1 to about 25 weight percent.

3. The process of claim 2 wherein the polymer of (b) is a homopolymer of limonene.

4. The process of claim 2 wherein the monomer of the low molecular weight polymer is alpha-methylstyrene.

5. The process of claim 2 wherein the polymer of (b) is a copolymer of styrene and alphamethylstyrene.

6. The process of claim 2 wherein component (a) is at least 70% by weight of the composition.

7. The process of claim 2 wherein the blowing agent comprises at least about 10% by weight of $CO_2$ based on the total weight of the blowing agent.

8. The process of claim 2 wherein the $T_g$ of the polymer of (b) is at least about 50° C.

9. The process of claim 2 wherein the expanding step comprises reducing the temperature of the plasticized mixture to increase its viscosity; and extruding the plasticized mixture into a zone at a temperature and pressure sufficient to permit foaming.

10. The process of claim 2 wherein the polymer (a) has a weight average molecular weight of at least about 130,000.

11. The process of claim 2 wherein the polymer (a) has a weight average molecular weight of less than about 700,000.

12. The process of claim 11 wherein the polymer (a) has a weight average molecular weight of less than about 400,000.

13. The process of claim 7 wherein the blowing agent comprises 20% by weight or more of $CO_2$ based on the total weight of the blowing agent.

14. The process of claim 2 wherein the blowing agent is 100% by weight $CO_2$.

15. The process of claim 2 wherein the blowing agent comprises $CO_2$ and ethanol.

16. The process of claim 2 wherein the blowing agent comprises $CO_2$ and water.

17. The process of claim 2 wherein the optionally rubber-reinforced monovinylidene aromatic polymer (a) is polystyrene; polymer (b) is poly(alpha methyl styrene); and the blowing agent is 100% by weight $CO_2$.

18. The process of claim 2 wherein the optionally rubber-reinforced monovinylidene aromatic polymer (a) is polystyrene; polymer (b) is a copolymer of styrene and alpha methyl styrene; and the blowing agent is 100% by weight $CO_2$.

19. A process for producing a closed-cell polymer foam comprising heating an expandable monovinylidene aromatic polymer composition consisting essentially of:
  (a) polystyrene having a weight average molecular weight of at least about 130,000; and
  (b) from about 1 to about 25 weight percent of poly(alpha methyl styrene) having a weight average molecular weight of at least about 1500 and less than about 25,000, a volatiles content of less than about 20% and a glass transition temperature of at least about 70° C.

to a temperature sufficient to provide a molten polymer; admixing carbon dioxide as blowing agent with said molten polymer to provide a plasticized mixture; heating the mixture to a temperature and applying a pressure such that the plasticized mixture does not foam; and thereafter, expanding the plasticized mixture at a reduced pressure to form a foam structure.

20. A process for producing a closed-cell polymer foam comprising heating an expandable monovinylidene aromatic polymer composition consisting essentially of:
  (a) polystyrene having a weight average molecular weight of at least about 130,000; and
  (b) from about 1 to about 25 weight percent of a copolymer styrene and alphamethylstyrene having a weight average molecular weight of less than about 30,000, a volatiles content of less than about 30% and a glass transition temperature of at least about 70° C.

to a temperature sufficient to provide a molten polymer; admixing carbon dioxide as blowing agent with said molten polymer to provide a plasticized mixture; heating the mixture to a temperature and applying a pressure such that the plasticized mixture does not foam; and thereafter, expanding the plasticized mixture at a reduced pressure to form a foam structure.

21. The process of claim 1 wherein the amount of low molecular weight polymer of limonene or alpha methyl styrene is from about 2 to about 20 weight percent.

22. The process of claim 1 wherein the amount of low molecular weight polymer of limonene or alpha methyl styrene is from about 2.5 to about 15 weight percent.

* * * * *